US005115254A

United States Patent [19]

Onishi et al.

[11] Patent Number: 5,115,254

[45] Date of Patent: May 19, 1992

[54] THERMAL TRANSFER RECORDING APPARATUS USING A THERMAL TRANSFER MATERIAL AND A RECORDING MEDIUM

[75] Inventors: Hiroshi Onishi, Hirakata; Tadao Kohashi, Kawasaki; Soichiro Mima, Nishinomiya; Hiroshi Esaki, Neyagawa, all of Japan

[73] Assignee: Matsushita Electric Industrial Co., Ltd., Osaka, Japan

[21] Appl. No.: 353,227

[22] Filed: May 12, 1989

Related U.S. Application Data

[62] Division of Ser. No. 165,983, Mar. 9, 1988, abandoned.

[30] Foreign Application Priority Data

Mar. 10, 1987 [JP] Japan ................................ 62-54548

[51] Int. Cl.$^5$ ........................ G01D 15/10; E41M 3/12

[52] U.S. Cl. ............................ 346/76 PH; 346/135.1; 428/206; 428/323; 428/304.4; 428/913; 428/914

[58] Field of Search ........................ 346/76 PH, 135.1; 428/913, 206, 323, 327, 403, 407, 484, 914, 304.4

[56] References Cited

U.S. PATENT DOCUMENTS 4,819,010 4/1989 Kohashi et al. ............... 346/76 PH 4,985,399 1/1991 Matsuda et al. ............... 428/913 X 5,001,106 3/1991 Egashira et al. ............ 428/304.4 X

*Primary Examiner*—Benjamin R. Fuller

*Assistant Examiner*—Gerald E. Preston

*Attorney, Agent, or Firm*—Wenderoth, Lind & Ponack

[57] ABSTRACT

A thermal transfer recording apparatus is disclosed and includes a recording medium sheet formed of a plastic film material having numerous minute voids therein, and a thermal recording sheet formed of a heat resistive base sheet with opposing surfaces and a thermal transfer layer coated onto one of the opposing surfaces of the base sheet. The thermal transfer layer comprises an ink material containing a binder material and being transferable to the recording medium sheet, and particles which are solid at room temperature and are mixed into the transfer layer in order to form minute protrusions on a surface of the thermal transfer layer. The apparatus also includes a heater for raising the temperature of the thermal transfer layer in a controlled manner so as to decrease the viscosity of the thermal transfer layer. The recording medium sheet can, alternatively, be provided with a coated layer coated onto the surface of the plastic film and comprises a coated layer material, and particles which are solid at room temperature and have a diameter greater than the thickness of the coated layer material, so as to provide a roughened surface to the coated layer.

12 Claims, 4 Drawing Sheets

THERMAL TRANSFER RECORDING APPARATUS USING A THERMAL TRANSFER MATERIAL AND A RECORDING MEDIUM

This application is a division of now abandoned application Ser. No. 165,983, filed on Mar. 9, 1988.

BACKGROUND OF THE INVENTION

The present invention relates to improvements in the method, apparatus and materials for thermal transfer recording using a thermal transfer material and a recording medium (image receiver).

There is known the method by which said thermal transfer material is transferred imagewise to said recording material using a thermal transfer sheet including a thermal transfer layer which is rendered transferable to said recording medium (image-receiving material) as its viscosity is decreased by imagewise temperature control using a thermal recording head or the like. As examples of the thermal transfer sheet for use in the above thermal transfer recording method, there has been proposed a thermal transfer sheet comprising a heat-resistant base sheet and, as disposed on one side of said heat-resistant base sheet, a thermal transfer layer comprising an ink material comprising a binder and a colorant and having surface corrugations formed by incorporation of solid particles having a diameter in excess of the thickness of the layer, wherein the viscosity of said ink material is subject to controlled decrease by imagewise temperature control so as to be rendered transferable to a recording medium ((Reference is made, for example, to Japanese Patent Application No. 59-227155 (corresponds, in part, to U.S. Pat. No. 4,819,010)).

This type of thermal transfer sheet is such that as a recording medium is pressed against its surface and a thermal recording head is applied against the reverse side of its heat-resistant base sheet to thereby impart controlled temperature increase thereto, the ink material whose viscosity is depressed according to the amount of thermal energy so applied is caused to penetrate and be transferred to the recording medium across the surface of said solid particles and as the thermal transfer sheet is peeled off the recording medium, the non-penetrating ink material is transferred, along with the solid particles to which it is adhered, to the recording medium to yeild a mono-color reproduction image or a full-color reproduction image through superimposition of 3 or 4 primary colors, which image having a continual gradient according to the varying amount of heat applied by the thermal recording head.

However, since the image transfer by this recording technique requires a uniform contact of solid particles with the recording medium, the latter must have a smooth surface. As the recording medium, paper such as wood-free paper or coated paper or a synthetic paper (for example, YUPO, Oji Yuka Synthetic Paper Co., Ltd.) have heretofore been employed. However, paper which is fibrous is generally poor in surface texture even after calendering so that the reproduced image quality is not high. While coated paper has a smoother surface, it is hygroscopic, as a general trail of paper, so that in the thermal transfer process under highly humid conditions, the coefficient of thermal conductivity is substantially increased in the thickness direction of the paper so that the thermal energy supplied by the thermal recording head tends to esccape in the thickness direction, with the result that the thermal energy required for melting the ink material is wasted to interfere with stable thermal transfer recording. Because of its low hygroscopicity, synthetic paper is indifferent to humidity but has a surface finished coarse for improved printability. Therefore, although it is not as fibrous as genuine paper, synthetic paper is unsuited for thermal transfer recording, providing only a poor image quality. Calendered sythetic paper has an improved surface smoothness but is as much deficient in flexibility and in cushioning property in thickness direction so that as the thermal transfer sheet is pressed against it, the solid particles in the thermal transfer layer are not well brought into contact with the surface of the synthetic paper and the ingress of the solid particles into the surface layer of the synthetic paper is attenuated, thus making the particles difficult to be transferred. Thus, with synthetic paper, it is difficult to achieve improvements in image quality and in the sensitivity of thermal transfer recording.

SUMMARY OF THE INVENTION

Object of the invention

Accordingly, it is an object of the invention, which has been completed in view cf the above difficulties, to provide an apparatus for thermal transfer recording by which images of good quality can be obtained and the sensitivity of thermal transfer recoridng can be improved, as well as an apparatus and a recording medium for carrying out said method.

Basic Constitution of the Invention

The apparatus for thermal transfer recording as provided by the invention in which a thermal transfer sheet having a thermal transfer layer capable of becoming transferable to a recording medium as a result of controlled decrease in the viscosity thereof as caused by controlled imagewise temperature rise is used and the material of said thermal transfer layer is transferred to the recording medium to give images is characterized in that a recording medium showing elasticity in the direction of the thickness thereof or a recording medium the base material of which is a plastic film having therewithin a large number of voids or pores is used as said recording medium.

The term "plastic film" as used herein also includes, within the meaning thereof, plastic films colored with one or more colorants and plastic films with a filler and/or the like added, for instance. The minute voids or pores within the film may be independent and separate from others or a plurality thereof may be connected with one another. The voids or pores should preferably be present at a density of at least one, more preferably more than one, per unit image element area.

The above-mentioned recording medium may be the above-mentioned plastic film itself (i.e. the base material itself), the surface layer of which is then to serve as the image receiver, or may be composed of the above-mentioned plastic film and one or more coat layers, such as an adhesive layer and a coated layer, applied onto the surface layer of said film. In the latter case, the uppermost layer is to serve as the image receiver.

Effects

The use of a plastic film having therewithin a large number of minute voids or pores as the base or substrate of the recording medium results in stabilization of the thermal transfer recording characteristics even when great variations of humidity are encountered since the plastic film is low in moisture absorption.

The recording medium showing elasticity in the direction of the thickness thereof and the recording medium the base material of which is a plastic film having a large number of minute voids or pores therewithin can give the surface thereof soft resilience or flexibility as well as cushion characteristics in the direction of the thickness. The voids or pores, namely air spaces, in the plastic film promote the elasticity of the plastic film. As a result, improved contact under pressure between the recording medium surface and the normally solid particles can be achieved. In addition, in the case of the plastic film having voids or pores, this contact is further assured as a result of thermal expansion of the pores upon controlled temperature rise.

Furthermore, the thermal conduction in the direction of the thickness of the plastic film can be reduced owing to the thermal insulation by the air existing in the voids or pores, as compared with a recording medium based on a pore-free plastic film.

Therefore, temperature rise limited to the recording medium surface where thermal transfer takes place can be achieved efficiently. As compared with the prior art methods, the heat energy supplied from the thermal recording head can be prevented from being lost by dissipation in the direction of the thickness of the recording medium. Consequently, efficient decrease in the viscosity of the ink becomes possible.

DETAILED DESCRIPTION OF THE INVENTION

Figure 1:
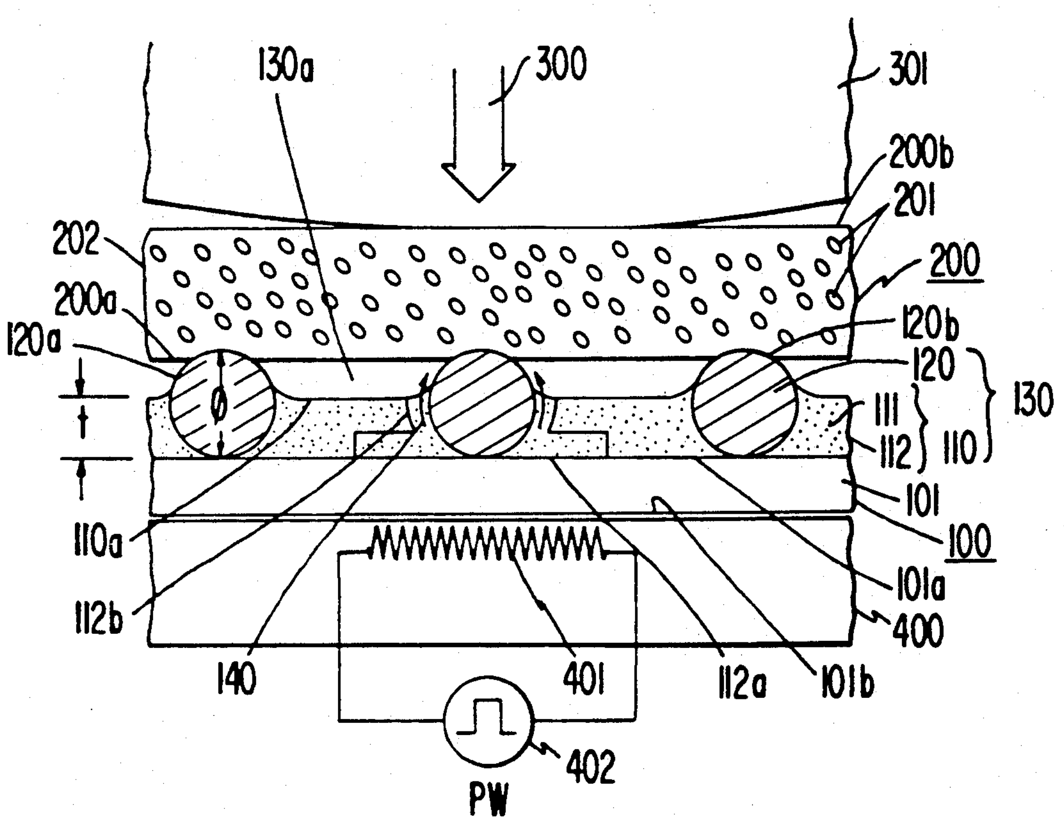
FIG. 1 shows a partial cross section of a thermal transfer recording apparatus according to one embodiment of the invention.

In the practice of the invention, the transferability of solid particles can be improved and accordingly the sensitivity in thermal transfer recording can be further improved when the material of the plastic film constituting the recording medium and further the material of the coat layer, such as a surface coat layer on said plastic film, are appropriately selected so that the recording medium surface, to which the ink is to be transferred, can be softened or further melted on the occasion of thermal transfer recording to allow the solid particles to sink in said surface to a greater extent and be fixed on the recording medium surface.

Furthermore, the transferability of the ink itself can be increased and, as a result, the thermal transfer recording sensitivity and the fixation of transferred images can be improved when the plastic film and further the coat layer, such as a surface coat layer, are selected such that they can become compatible with at least one ink component when the temperature is raised.

Even when the thermal transfer layer on the thermal transfer sheet is made of an ink layer alone without using normally solid particles, improved uniformity of contact between the thermal transfer sheet surface and the recording medium surface and improved thermal transfer recording sensitivity can be attained and, furthermore, the thermal transfer recording sensitivity and the fixation of transferred images can be further improved by appropriately selecting the plastic film material and the surface coat layer material so that these materials can become compatible with at least one ink component when the temperature is raised.

The term "compatibility" as used herein includes, within the meaning thereof, partial compatibility as well as complete compatibility and further includes the phenomenon of mixing under fusion or melting of the same material.

The term "normally solid particles" as used herein is illustrated in the following. Generally, the uppper limit of the ambient temperature for the use of conventional thermal transfer printers in which a thermal recording head and a thermal transfer sheet of the melting type are used is set at 35° C. which is the upper limit of ordinary temperature. On the other hand, the essential role of the normally solid particles is to prevent the recording medium surface and the thermal transfer layer surface from coming into complete contact with each other over the whole surface area at ordinary temperature before temperature raising, with the protrusions on the thermal transfer layer, which are formed due to the presence of the normally solid particles, serving as spacers, when the thermal transfer sheet is pressed against the recording medium under the platen pressure (recording pressure).

Accordingly, the "normally solid particles" are defined as particles having a sufficient hardness to prevent the whole area contact between the recording medium surface and the thermal transfer layer surface within the temperature range the upper limit of which is 35° C., at least without complete disintegration of said protrusions.

The melting point and softening point of the normally solid particles may be lower or higher than or equal to those of the binder materials.

Each protrusion may be constituted by one normally solid particle as a result of employment of a normally solid particle material having a particle size greater than the ink layer thickness or by an aggregate of a plurality of normally solid particles each having a particle size smaller than the ink layer thickness, or by both of these.

Usable as the normally solid particles are, for example, inorganic compound particles, organic compound particles, metal particles, thermoplastic resin particles, wax particles, other hot melt particles, thermosetting resin particles, ceramic particles, glass particles and rubbery particles.

The normally, solid particles may be or may not be softened by melting within the controlled temperature raising region (e.g. 35° C. to 250° C.).

Among the normally solid particles, those which will be neither melted nor decomposed are herein referred to as solid particles for convenience sake.

FIG. 1 is a schematic representation of an embodiment of the thermal transfer recording apparatus according to the invention.

A thermal transfer sheet is indicated by 100, and a recording medium by 200. The recording medium 200 is pressed against the sheet 100 by a pressure 300 exerted by a platen 301. Said pressure 300 is set, for example, at a high level of about 1-5 kg/m$^2$ so that sufficiently good contact and good transfer recording can be attained.

The thermal transfer sheet 100 carries, on the side 101*a* of a thin heat-resistant film or the like base sheet 101, a thermal transfer layer 130 comprising a thin ink material layer 110 consisting of a mixed material composed of a coloring material 111 containing a pigment or dye in use in printing inks or paints and a binder material 112 whose viscosity is decreased upon temperature rise, for example a hot melt binder material such as a wax or a macromolecular material. In the ink material layer 110, there are disposed, as the normally solid particles 120, the so-called solid particles preferably having a higher melting point (softening point) as compared with the binder material and, thus, the thermal transfer layer 130 is constituted by said layer 110 and said solid particles. In the example shown, the normally solid particles 120 are spherical and their particle size is so selected that it is not smaller than the thickness t of the ink material portion 110 occurring among the particles 120. Therefore, the normally solid particles 120 partially protrude from the ink material layer surface 110*a* in those portions in which the particles 120 are absent, so that the surface of the thermal transfer layer 130 shows a finely jagged appearance. The surface 120*a* of the protruding portions of the normally solid particles may be coated thinly with the ink material 110.

The normally solid particles 120 may be either inorganic particles or organic particles. In either case, it is desirable to select colorless, light-colored, white, transparent or semitransparent particles so that the transferred images or, in particular, the color in the case of color recording may not be affected seriously. The particles are not always required to have the spherical form.

The normally solid particles 120 which meet the requirement that they should have a particle size greater than the thickness of the layer consisting of the ink material 110 are usable when their size is within the range of 1.5-40 μm, preferably 1.5-15 μm. When the normally solid particles 120 falling within this practical particle size range and exceeding in size the thickness t of the layer consisting of the ink material 110 are present in a substantial amount, the particle size distribution may be such that the normally solid particles 120 contain those normally solid particles which have a particle size $\phi$ smaller than the thickness t of the layer of the ink material 110.

The particle size of the colorant 111 is generally smaller than the thickness t of the layer of the ink material 110. When a pigment is used as the colorant 111, the particle size distribution of the pigment may be such that there are also present those pigment particles that have a particle size not less than 1.5 μm, supposing that the thickness t of the layer consisting of the ink material 110 is not greater than 15 μm. In this case, those pigment particles that have a particle size greater than 1.5 μm can serve by themselves as the normally solid particles 120, so that addition of normally solid particles of another material can be omitted.

In the thermal transfer layer 130, the normally solid particles 120 are added to the ink material 110 generally in an amount of 2.5-230 parts by weight per 100 parts by weight of the ink material 110.

The coating amount of the thermal transfer layer 130 is selected preferably within the range of 0.5-6.5 g/m$^2$.

Particularly good continuous gradient transfer recording characteristics are obtained when the particles size distribution of the normally solid particles 120 is such that the maximum particle size is not greater than 40 μm, preferably not greater than 15 μm, and the mean particle size (median) is 2-10 μ, preferably 2-5 μm, and when the normally solid particles 120 are added in an amount of 2.5-230 parts by weight per 100 parts by weight of the ink material 110, as mentioned above, and the thermal transfer layer 130 is applied within the coating amount range of 0.5-4 g/m$^2$.

The reference numeral 400 indicates a thermal recording head of the known linear type which includes a plurality of resistance heating elements 401 arranged int eh direction normal to the plane of the drawing. The thermal recording head is brought into contact with the back 101*b* of the base material under pressure. A signal for temperature raising, such as the pulse-width ($P_H$) modulation electric signal 402, is applied selectively to the resistance hating elements 401, and the temperature of the thermal transfer layer 130 is raised controlledly for recording by means of the heat generated by said elements and transferred through the base material 101.

The recording medium 200 comprises, as the base or substrate, a plastic film 202 having voids or pores 201 therewithin. The plastic film 202 having voids or pores 201 therewithin may be semitransparent or opaque as a result of its containing voids or pores 201, with or without coloration of the plastic material itself, or may be opaque as a result of addition of an additive or additives. On the front side 200*a* facing the thermal transfer layer 130 the voids or pores 201 should preferably be closed so that irregularities in image quality as otherwise resulting from decreased surface smoothness can be avoided.

It is possible to make the opaque plastic film 202 resemble ordinary paper in color by adding an inorganic matter (e.g. calcium carbonate, talc) as the additive. Thus, for instance, a polypropylene-based plastic film 202 (e.g. TOYOPEARL, Toyobo Co., Ltd.) may be used. For efficient thermal expansion of the gas within the voids or pores 201, the voids or pores 201 should preferably be present within the film at a density of at least one closed void or pore or, in other words at least one bubble, per unit image element area, namely per resistance heating element (401) area.

When the plastic film 202 is semitransparent, the film may be rendered substantially opaque by applying a desired color ink (e.g. white ink) to the side 200*b*, which is not a thermal transfer layer-receiving side, by the conventional printing or coating technology, for instance.

In transfer recording, application of the signal 402 for temperature raising first results in temperature rise of the ink material layer 110 from the back side 101*a*. When after arriving at the melting point, the required heat of fusion is supplied, the hot melt binder material 112 melts and becomes liquid at this constant melting temperature, whereby the so-called molten ink material 112*a* having a substantially reduced viscosity is formed.

In the state in which the recording signal 402 is still applied, the temperature of said molten ink material 112*a* again starts to raise from the back side of the layer (namely from the base material surface 101*a*) above the melting point. The viscosity of the material 112*a* is further decreased in accordance with the temperature rise, whereby said material acquires flowability. At the same time, heat conduction through this molten ink material 112*a* causes the melting of the binder material 112 to proceed to the ink material layer surface 110*a*.

On the other hand, when solid particles having an appropriately higher melting (or softening) point as compared with the binder material 112 are selected as the normally solid particles 120, the heat of fusion is supplied also to the unmelted ink material 110 occurring in contact with the particle surface 120*a* owing to hat conduction from the base surface 101*a*, or form the molten ink material 112*a*, via the normally solid particles 120.

Accordingly, as shown in FIG. 1, a molten ink material 112*b* is generated along the solid particle surface 120*a*. The molten portion enlarges with the applied pulse width $P_W$ of the recording signal 402, and the viscosity of the molten portion further decreases and the flowability increases.

Generally, in phase transition from a solid to a liquid, the volume expansion coefficient increases discontinuously. This tendency is particularly remarkable with hot melt waxes. With montan wax species, for instance, the volume expansion rate may reach about 60%.

The so-called molten ink material 112*a*, 112*b* resulting in the above manner from melting of the binder material 112 and decrease in the viscosity thereof is forced out, penetrates and adheres, and hence is transferred, to the recording medium surface 200*a* along the normally solid particle surface 120*a*, as shown by the arrow 140, owing to the thermal expansion of the binder material 112 upon its melting, the surface tension of the molten ink material 112*a*, 112*b*, the phenomenon of capillarity between the normally solid particles 120 and the recording medium surface 200*a*, the pressure 300, and so forth.

After completion of the application of the signal 402, when the normally solid particles 120 are still mobile, the recording medium 200 is peeled off from the thermal transfer sheet 100, whereby part of the molten ink material 112*a*, 112*b*, in adhesion to the normally solid particles surface 120*a*, adheres, and hence is transferred, to the recording medium surface 200*a* together with the normally solid particles 120. Thus is obtained a transferred record containing the colorant 111.

A maximum value of the transfer record density is obtained when the whole ink material 110 in the thickness direction t is transferred together with the normally solid particles 120 as a result of melting of the ink material 110 up to the ink material layer surface 110*a* as resulting from further increase in the pulse width $P_W$ applied by the signal 402.

In this manner, the ink material layer 110 melts and its viscosity decreases corresponding to the pulse width $P_W$ of the recording signal 402, and the molten ink material 110 together with the normally solid particles 120 provides a transferred record on the recording medium surface 200*a* corresponding to the decrease in viscosity thereof. Therefore, continuous gradient recording corresponding to the pulse width $P_W$ can be achieved, with each normally solid particle 120 as a unit, the optical density simultaneously depending on density modulation and area modulation. While, in FIG. 1, the density of the normally solid particles 120 is one per unit image element area, the image element itself can advantageously be controlled in the manner of density gradient control when the density of the normally solid particles 120 is selected at an appropriate high level.

In the above thermal transfer recording, the heat of fusion is supplied to the unmelted ink material 110 in contact with the normally solid particle surface 120*a* by heat conduction via the normally solid particles 120 and at the same time heat escape is allowed to take place from eh portions 120*b* in contact with the recording medium surface 200*a* to the side of the recording medium 200. However, since the voids or pores 201, namely bubbles, are present within the recording medium 200, the heat conduction in the direction of the thickness of the recording medium 200 can be reduced by the insulating effect of the bubbles. Heat is thus readily accumulated on the side of the recording medium surface 200*a* and, as a result, the recording medium surface 200*a* in the vicinity of the portions 120*b*, which are in contact with the normally solid particles 120 is heated. This facilitates the migration of the molten ink material 112*a*, 112 *b* in the direction toward the recording medium surface 200*a* through penetration over the normally solid particle surface 120*a*. As a result, the molten ink material 112*a*, 112*b* is efficiently transferred to the recording medium surface 200*a*, giving firm and stable transfer records having good gradient characteristics.

Furthermore, the presence of said voids or pores 201 makes the recording medium surface more flexible, giving said surface increased cushioning characteristics, as compared with films made of the same material but free from such voids or pores 201. Moreover, the close contact or ingress of the normally solid particles with or into the surface 200*a* is facilitated by thermal expansion of the voids or pores (bubbles) within the recording medium 200 when the temperature is raised. Therefore, the penetration of the molten ink 112*a*, 112*b* becomes easier. This results in increased thermal transfer recording sensitivity.

In addition, since the recording medium 200, to which the ink material 110 is to be transferred, contains voids or pores 201 but is pore-free on the surface 200*a*, said recording medium has a smooth surface like the conventional plastic films. Thus the normally solid particles 120 can come into contact with and invade into the recording medium 200 uniformly, so that irregularities in recorded images can be prevented. For attaining increased transferability, it is also possible to use recording media surface-treated, for example by corona treatment, to an extent sufficient for the prevention of irregularities in recorded images (for example to an extend of a mean center line roughness of the recording medium surface 200*a* of not more than 1.0 μm). If, in that case, the melting (softening) point of the plastic, which is the main component of the plastic film 202 (and hence, of the recording medium 200), is adequately low so that the recording medium can be softened or melted in the neighborhood of its surface 200*a* as a result of temperature rise in and heat conduction via the normally solid particles 120 upon application of heat energy for the transfer of the ink material 110, the ingress of the normally solid particles and the fixability of recorded images are increased. At the same time, the proportion of transferred normally solid particles 120 is increased. As a result, an increased transfer recording sensitivity is attained. The fixability of the transfer ink material and the transfer recording sensitivity can be further improved by selecting, as the material of the plastic film 202, a material capable of becoming compatible with at least part of the ink material 110 at the time of controlled temperature rise for recording.

Furthermore, when a thin coat layer capable of becoming compatible with at least part of the ink material 110 when the temperature is raised is formed on the surface of the film 202, on which thermal transfer recording is to be made, namely on the recording medium surface 200*a* in the example shown, the adhesion of the molten ink material 112*a*, 112*b* to said thin layer is improved because of at least partial compatibility attained when the ink material penetrates into said thin layer. As a result, the fixability is improved and the transfer efficiency, hence the transfer recording sensitivity, can also be improved.

In addition, when part of this coat layer is constituted by a material capable of showing rubber elasticity at least at room temperature (for example a thermoplastic elastomer), the material showing rubber elasticity can provide the coat layer itself with flexibility even if the material compatible with part of the ink material 110 lacks in flexibility. In that case, the flexibility of the plastic film 202 is also improved and, accordingly, the quality of transferred records can also be improved.

The coat layer may comprise a plurality of layers. For example, a thermoplastic elastomer layer may be formed between a thin layer made of a material capable of becoming compatible with part of the ink material 110 and the plastic film 202, whereby said thermoplastic elastomer layer can serve also as an adhesive layer and at the same time can function as a flexible layer promoting the flexibility of the plastic film 202, thus allowing more uniform contact between the recording medium 200 and the thermal transfer layer 130. The fixability at the time of transfer can be improved by means of the layer consisting of a material capable of becoming compatible with part of the ink material 110 on the surface. Therefore, the transfer recording sevsitivity as well as the quality of transferred images can be further improved.

Usable as the thermoplastic elastomer are, for instance, thermoplastic elastomers composed of polystyrene and polybutadiene (e.g. TUFPRENE®, Asahi Chemical Industry Co., Ltd.; KRATON®, Shell Chemical Co.; SOLPRENE®, Phillips Petroleum Co.), thermoplastic elastomers composed of polystyrene and polyisoprene (e.g. CARIFLEX®, Shell Chemical Co.), thermoplastic elastomers composed of polyester and polyether (e.g. HYTREL®, E. I. du Pont de Nemours & Co.; TRO®, Exxon Chemical Co.), and thermoplastic elastomers composed of polyurethane and polyester (PANDEX®, Dainippon Ink and Chemicals, Inc.; DESMOPAN®, Bayer A. G. ).

As said material showing rubber elasticity at least at room temperature, there may be mentioned, in addition to the above thermoplastic elastomers, such rubber materials as polybutadiene, polyisoprene, polyacrylic rubbers and urethane rubbers.

For the production of plastic films 202 containing a large number of minute voids or pores 201 and having, on the surface thereof, a thin, smooth, nonporous, continuous coat layer, several methods are known.

In British Patent No. 922,288, for instance, there is described a method of producing pore-containing polypropylene films having a silver-resembling appearance which comprises stretching polypropylene films at low temperatures at a draw ratio of not less than 5.5 while allowing necking.

In Japanese Patent Publication No. 677/71, there is described a method of producing composite polypropylene films having a pearl-like luster which comprises subjecting two or more superimposed unoriented polypropylene films having a double refraction index of not more than 0.01 to necking stretching at least in one direction while maintaining one or both sides of the film mass before necking at a temperature of not higher than 45° C., to thereby cause formation of a number of minute voids or pores within each film and at the same time cause adhesion between the films.

In Japanese Patent Publication No. 29191/86, there is described a method of producing polyolefin films made of a mixture composition composed of a polyolefin selected from among polyethylene, polypropylene, polybutene-1, poly-4-methylpentene-1 and copolymers of these and 3–15% by weight, relative to said polyolefin, of polytetramethylene terephthalate and having a large number of minute voids or pores therewithin by stretching at least in one direction.

Japanese Patent Publication No. 49-2016 teaches the production method for a polyester-type non-polyolefin film having a pearlescent luster which comprises melt-extruding a mixture of a polyester predominantly composed of repeating units of ethylene terephthalate and 2 to 15 weight percent of a polystyrene with a secondary transition temperature of 80° C. to give a film and stretching the film biaxially in a ratio of 2.5 through 4.5 each at a temperature higher than the secondary transition temperature of said polyester and lower than the secondary transition temperature of said polystyrene.

On other hand, Japanese Patent Publication No. 54-31032 and No. 54-31033 describe the method for producing a void-including biaxially oriented polyolefin film, wherein a composition comprising, by weight percent, 25 to 75% of polyethylene, 5 to 50% of a particulate inorganic material, such as calcium carbonate, calcium oxide, silica, titanium oxide, alumina or aluminum sulfate, with a particle size of 0.1 to 15 μm, and 10% of polypropylene is biaxially stretched in sequence in an area multiple of 8 or more.

Regarding the above production method for a void-containing film containing 5 to 50 percent of inorganic particles, a variety of modifications are known. As one of such modifications, Japanese Patent Publication No. 51-33151 discloses a production method in which 5 to 70% of an ethylene-propylene copolymer with a propylene content of 1 to 30 mol % is used in lieu of 5 to 75% of polyethylene and the proportion of polypropylene is increased to 20% or more. Japanese Patent Publication No. 54-31030 teaches a method wherein the proportion of polyethylene is 5 to 70% and 20% or more of an ethylene-propylene copolymer with an ethylene content of 1 to 15 mol % is used in lieu of 10% or more of propylene. In the method described in Japanese Patent Publication No. 51-33152, 5 to 70% of an ethylene-propylene copolymer with a propylene content of 1 to 30 mol % is used in lieu of 5 to 75% of polyethylene and 20% or more of an ethylene-propylene copolymer with an ethylene content of 1 or 15 mol % is used in lieu of 10% or more of polypropylene. Furthermore, Japanese Patent Publication No. 54-31034 teaches a production method wherein 5 to 70% of polyethylene or an ethylene-propylene copolymer with a propylene content of 0 to 30 mol % is used in lieu of 5–75% of polyethylene, 5% or more of polypropylene or a propyleneethylene copolymer with an ethylene content of 0 to 30 mol % is used in lieu of 10% or more of polypropylene, and 5 to 60% of styrene resin is additionally incorporated.

As the plastic film 202 constituting the recording medium 200 used in the thermal transfer recording method of the present invention, any and all of the polyolefin or non-polyolefin films including a multiplicity of fine voids 201 that can be produced by the above-cited production technologies and other analogous technologies can be employed.

Regarding the void ratio of such a plastic film 202 including voids 201, in terms of the total volume of voids 201 per 100 grams of film 202, films including 30 to 100 cc of voids 201 in each 100 grams of film 202 are preferable.

If the void rate is less than 30 cc/100 g, the film 202 will be deficient in cushioning property in the thickness direction. On the other hand, if the void rate exceeds 100 cc/100 g, the cushioning property in the thickness direction will be too great and the surface smoothness be adversely affected, thus failing to give a thermal transfer image of delicate quality.

Among the above-mentioned void-including plastic films, polyolefin films are superior in flexibility and cushioning property in thickness direction and preferred, irrespective of whether they are oriented or not oriented.

Particularly, a void-containing, biaxially-oriented polyolefin film containing inorganic particles and at least one of polypropylene and ethylene-propylene copolymer, which may for example be manufactured by the above-mentioned technology, may provide a highly smooth, nonporous, continuous surface not greater than 1 μm in thickness as film surfaces 200*a* and 200*b*, with the additional advantages of good flexibility and cushioning propery, and is, therefore, suitable for the purposes of the present invention. The true specific gravity of such an inorganic particles-including voids-containing polyolefin film is in the range of 0.9 to 1.2 but it is recommended to select a film having an apparent specific gravity of 0.58 to 0.70 and a thickness of 50 to 250 μm as the plastic film 202 constituting the recording medium 200.

The volume of the voids (bubbles) per 100 g of a film 202 having an apparent specific gravity within the above-defined range is in the range of 86 to 37 cc.

If the apparent specific gravity is more than 0.70 and the thickness is less than 50 μm, the cushioning property of the film in its thickness direction will be poor so that a thermal transfer image of high quality will hardly be obtained. On the other hand, if the apparent specific gravity is less than 0.58 and the thickness is greater than 250 μm, the film 202 will have an excessive cushioning property in thickness direction and be too flexible. Moreover, the variation of film thickness will be greater than ±5% so that the smoothness of the film surface 200*a* will be too poor to yield a thermal transfer image of acceptable quality. From the standpoints of assuring a thermal transfer record of good quality, the above-defined ranges of apparent specific gravity, void rate and thickness for film 202 are applicable not only to said inorganic particles-including voids-containing polyolefin films but also to other voids-containing polyolefin or non-polyolefin films.

As mentioned hereinbefore, the recording medium having sufficient flexibility in thickness direction assures a remarkable improvement in contactability, thus contributing to thermal transfer recording sensitivity and reproduction image quality. The flexibility of the recording medium can be expressed as a unit strain value against a given stress (10 g/mm$^2$) in thickness direction. This unit strain value (μm) in thickness direction can be expressed as follows.

$$\text{Strain per unit thickness } (\mu m) = \frac{\text{Strain against } 10 \text{ g/mm}^2 \text{ stress}}{\text{Thickness of recording medium } (\mu m)}$$

Preferably, the unit strain value is not less than 0.5 μm. If the unit strain value is less than 0.5 μm, the density variation of the record obtained by the thermal transfer recording method of FIG. 1 will be too great. In contrast, when the unit strain value is not less than 0.5 μm, the resulting image is satisfactory in quality and, in addition, the transfer recording sensitivity is enhanced.

Aside from the above-mentioned voids-containing plastic films, plastic films containing rubber materials such as fluorine-containing rubber, polybutadiene, polyisoprene, etc., polystyrene-polybutadiene or polyisoprene block copolymer or other thermoplastic elastomers as well as various types of paper containing the above materials can also be used as said recording medium. Such plastic films, in which said rubber or thermoplastic elastomer have been uniformly distributed, can be prepared by the conventional heat extrusion technology and used as the recording medium. With regard to paper, a binder containing said rubber or thermoplastic elastomer material may be added in the paper-making process or a solution of such a material may be coated on or partially imbibed into paper.

EXAMPLE 1

Figure 2:
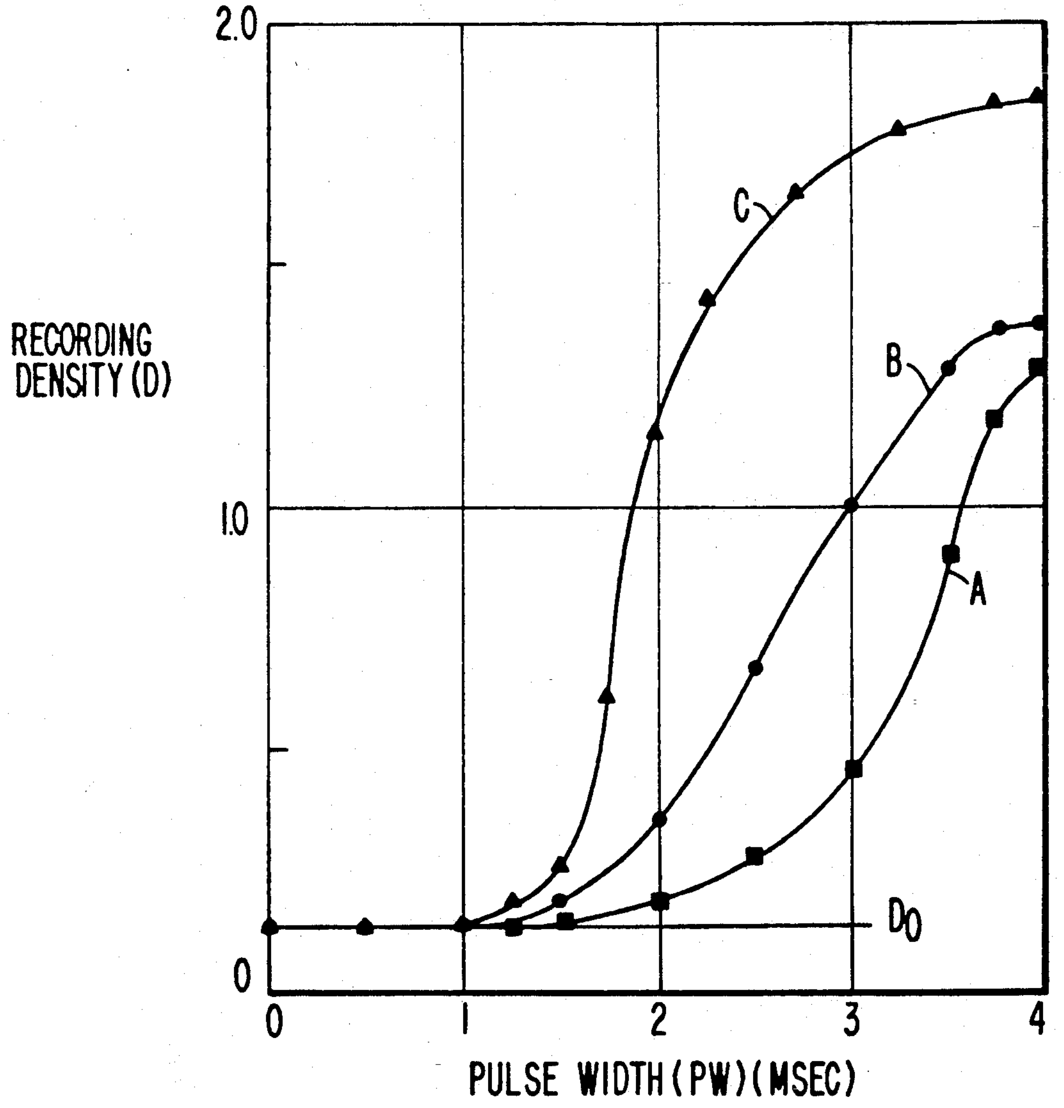
FIG. 2 shows thermal transfer recording characteristics obtained by a thermal transfer recording apparatus according to the invention and a conventional thermal transfer recording apparatus.

FIG. 2 shows an example of thermal transfer recording. The density of the record was determined with a Macbeth reflective type densitometer RD-914 (Kollmorgen Co.). For the fabrication of a thermal transfer sheet 100, a polyethylene terephthalate (PET) film with a thickness of 9 μm was used as the heat-resistant base sheet 101 and the following composition was used for the ink material 110.

| | |
|---|---|
| Ethylene-vinyl acetate copolymer (EVAFLEX ®, Mitsui Polychemical Co., Ltd.) | 10 parts by weight |
| Hydrogenated petroleum resin (ARKON ®, Arakawa Chemical Industries, Ltd.) | 20 parts by weight |
| Paraffin wax (m.p. 50-52° C.) | 10 parts by weight |
| Cyan pigment (CI. Pigment Blue 15) | 20 parts by weight |

As the normally solid particles 120, 60 parts by weight of solid alumina powder (WA #4,000, Fujimi Kenmazai Kogyo Co., Ltd.), the average particle size of which was about 3 μm, was used. This alumina powder was dispersed in 240 parts of xylene in which 60 parts by weight of said ink material 110 had been dissolved.

The homogeneous mixture thus obtained was coated on a heat-resistant base sheet 101 and dried to give a heat transfer layer 130, whereby a sheet 100 was obtained. The coating coverage of the heat transfer layer 130 was 1.7 g/m$^2$ on a dry basis. The number of projections effective for thermal transfer recording was approximately 600 per unit scanning spot area (0.25 mm×0.25 mm).

As the thermal recording head 400, the conventional linear head whose resistance heating elements 401 had an array density of 4 dots/mm was used. The power applied to each element 401 was 0.6 W/dot.

The horizontal scanning line speed was 16.7 msec/-line and the vertical scanning line density was 4 lines/mm. The platen pressure 300 was 2 kg/cm$^2$. The characteristic A (comparative example) shown in FIG. 2 is the thermal transfer recording characteristic obtained using a synthetic paper consisting predominantly of polypropylene and having a highly smooth surface (YUPO ®, Oji Yuka Synthetic Paper Co., Ltd.; 150 μm thick, unit strain in thickness direction = 0.43 μm) as the recording medium 200. The characteristics B and C represent examplary recording characteristics according to the present invention.

The characteristic B was obtained using the following recording medium. Thus, a film which was also composed predominantly of polypropylene but contained about 20 weight % of calcium carbonate powder with an average particle size of about 1.5 μm was biaxially stretched in an area multiple of at least 8 in succession to give a biaxially oriented polyolefin film which was white and opaque, contained a multiplicity of fine voids 201 nucleated by calcium carbonate particles, with an apparent specific gravity of 0.62 (void rate: about 70 cc/100 g). This film is commercially available from Toyobo Co., Ltd. under the tradename of TOYO-PEARL ®, and the thickness and unit strain in thickness direction of the film were 110 μm and 0.75 μm, respectively.

The characteristic C was the thermal transfer recording characteristic obtained under the following conditions. Thus, the surface of a recording medium comprising the same void-containing polyolefin film as that used in the recording of the characteristic B was coated, by the solvent coating method, with a chlorinated polypropylene (SUPERCHLON ®, Sanyo-Kokusaku Pulp Co., Ltd.) which is one of a resin compatible on heating with the hydrogenated petroleum resin constituting the binder material 112 to form a coating film at a dry coverage of about 10 g/m$^2$, whereby a composite recording medium 200 was fabricated. Then, the coated surface of the composite medium 200 was utilized as the recording medium surface 200*a*.

As is apparent from FIG. 2, characteristic B was superior to characteristic A, and characteristic C was superior to characteristic B.

Moreover, compared with characteristic A, characteristics B and C were more conducive to uniform and fine-grained transfer images. Furthermore, the thermal transfer records obtained were greater in resistance to friction in the order of A<B<C. Thus, the present invention provided improvements in the physical strength and fixation quality of records.

EXAMPLE 2

In the same manner as Example 1, 60 parts by weight of solid alumina powder with an average particle size of about 3 μm (normally solid particles 120) was dispersed in a solution of 15 parts by weight of polysulfone resin (a heat-resistant adhesive) in 240 parts by weight of methylene chloride and this dispersion was coated on a 9 μm-thick polyethylene terephthalate film (heat-resistant base sheet 101) to form a coating layer with a coverage of 1.5 g/m$^2$ (on a dry basis), whereby the normally solid particles 120 were bound to the film surface 101*a* to form surface irregularities due to the projecting ends of the particles 120. Then, this irregular surface was further coated with a mixture of 60 parts by weight of the same ink material 110 as used in Example 1 and 240 parts by weight of xylene at a coverage of 1 g/m$^2$ (on a dry basis) to form an ink layer with an irregular surface due to said particles 120.

Using this thermal transfer sheet 100 and the recording medium 200 of Example 1, thermal transfer recording was carried out under otherwise the same conditions as Example 1. As a result, the alumina particles (normally solid particles 120) remained secured to the film surface 101*a* and were not transferred to the recording medium 200 but only the ink material 110 was transferred and recorded.

The thermal transfer recording characteristics obtained were also similar to the characteristics A, B and C of Example 1.

Thus, in the construction of the thermal transfer sheet 100 used in accordance with the invention, the normally solid particles 120 may or may not be transferred, together with the ink material 110, to the recording medium 200.

As the normally solid particles 120 which are mixed in the ink material or secured to the surface of the base sheet 101 for the formation of surface irregularities, not only the above-mentioned alumina powder but also various other particulate materials can be employed. Where such particles are incorporated in the ink material 110, they are preferably colorless and clear or white from the standpoint of the brightness of reproduced color. With regard to the shape of particles, it need not be spherical.

The particles 120 may also be porous, instead of being non-porous, or the projections may each be formed with a single particle or by clustering or agglomeration of more than one particles, or by both of them. Particularly in the latter case, the size (ϕ) of the particles 120 may be smaller than the thickness (t) of the ink layer 110.

As the normally solid particles 120 which are either incorporated in the ink material 110 or secured to the surface of the base sheet 101, there may be employed particles of various materials which, as a minimum requirement, soften or melt in the controlled heating temperature range (for example, 35° C. to 250° C.), such as particles of silica, clear glass, fused quartz, titanium oxide, kaolin, benzoguanamine resin, etc., thermosetting resins such as epoxy resin, polyimide resin, etc., thermoplastic resins such as polyamide resin, polycarbonate resin, acrylic resin, etc., waxes such as carnauba wax, sasolwaks, etc., hot-melt materials containing thermoplastic resins or waxes, and rubbers such as silicone rubber and so on.

Thus, where the normally solid particles 120 are incorporated in the ink material 110 to form a thermal transfer layer 130 with an irregular surface, it is not an exclusive choice to use, as said particles 120, a material which softens or melts in the controlled heating range (e.g. 35° C.-250° C.) such as the abovementioned thermoplastic resins, waxes and rubbers. Rather, it is possible to constitute a coating film which is compatible with at least one component of such heat-softening or heat-melting normally solid particles 120 at least within the above-mentioned controlled heating range (e.g. 35° C.-250° C.) on the recording medium or selecting the materials so as to assure a compatibility with the very recording medium surface, whereby a continuous gradation image can be obtained with high recording sensitivity.

In connection with the above, a marked improvement of recording sensitivity can be realized by selecting a suitable combination of materials so as to assure a mutual or inter-compatibility between at least one component of the ink material 110, particularly of the binder material 112, and the normally solid particles 120 or/and even the surface of the recording medium or the coating layer on the recording medium at least in the controlled heating temperature range (e.g. 35° C.-250° C.).

Inclusive of such cases, at least one component each of the three constituent materials, namely the binder material 112, the normally solid particles 120, and the surface film, coated or otherwise, of the recording medium, may be the same material.

The particularly preferred recording medium according to the present invention is a biaxially oriented plastic film, particularly a polypropylene, ethylene-propylene copolymer or other polyolefin film which contains a multiplicity of fine voids with a volume of 30 to 100 cc per 100 gram of the film, includes inorganic particles such as described hereinbefore and has an apparent specific gravity in the range of 0.58 to 0.70, and a thickness in the range of 50 to 250 μm, or a film analogous thereto in structure.

EXAMPLE 3

To prepare the ink material 110 for the thermal transfer sheet 100, a mixture of 21 parts by weight of a modified acrylic resin with a softening point of 85° C. (PERFECTER ,Hitachi Chemical Co., Ltd.) as a material for the binder 112 and normally solid particles 120, 12 parts by weight of a cyan pigment (CI Pigment Blue 15) as the coloring material 111, and 180 parts by weight of a solvent mixture of toluene-methyl ethyl ketone-isopropyl alcohol was heated to about 60° C. to dissolve the modified acrylic resin. This mixture was milled in a ball mill at room temperature (25° C.) to prepare a coating dope.

Using a bar coater, the above dope was coated on the surface of a 9 μm-thick PET base sheet 101 at room temperature (25° C.) to give a thermal transfer layer 130 (a dry coverage of 0.7 g/m$^2$).

A large proportion of the modified acrylic resin forms the binder material 112 but a portion separates out in granular form upon evaporation of the solvent to give the normally solid particles 120. These precipitated particles form discrete projections with a maximum height of about 8 μm on the surface of the ink layer 110 to thereby form a thermal transfer layer having an irregular surface. The distribution density of such projections is several per unit scanning spot, that is to say the area corresponding to each of the resistance heating elements 401 of the thermal recording head 400 described in Example 1.

The recording medium 200 to which the image is to be transferred from the thermal transfer sheet 100 fabricated in the above manner was manufactured by the following procedure.

As the base sheet of the recording medium 200, the same void-containing polyolefin film described in Example 1 (TOYOPEARL ®, Toyobo Co., Ltd.) and its surface was coated, by means of a bar coater, with a solution of 40 parts by weight of a low molecular weight polystyrene with a softening point of 95° C. (HYMER ®, Sanyo Chemical Industries, Ltd.) in 60 parts by weight of toluene-methyl ethyl ketone-isoproyl alcohol. The coating coverage was 2.3 g/m$^2$ (on a dry film basis.)

Figure 3:
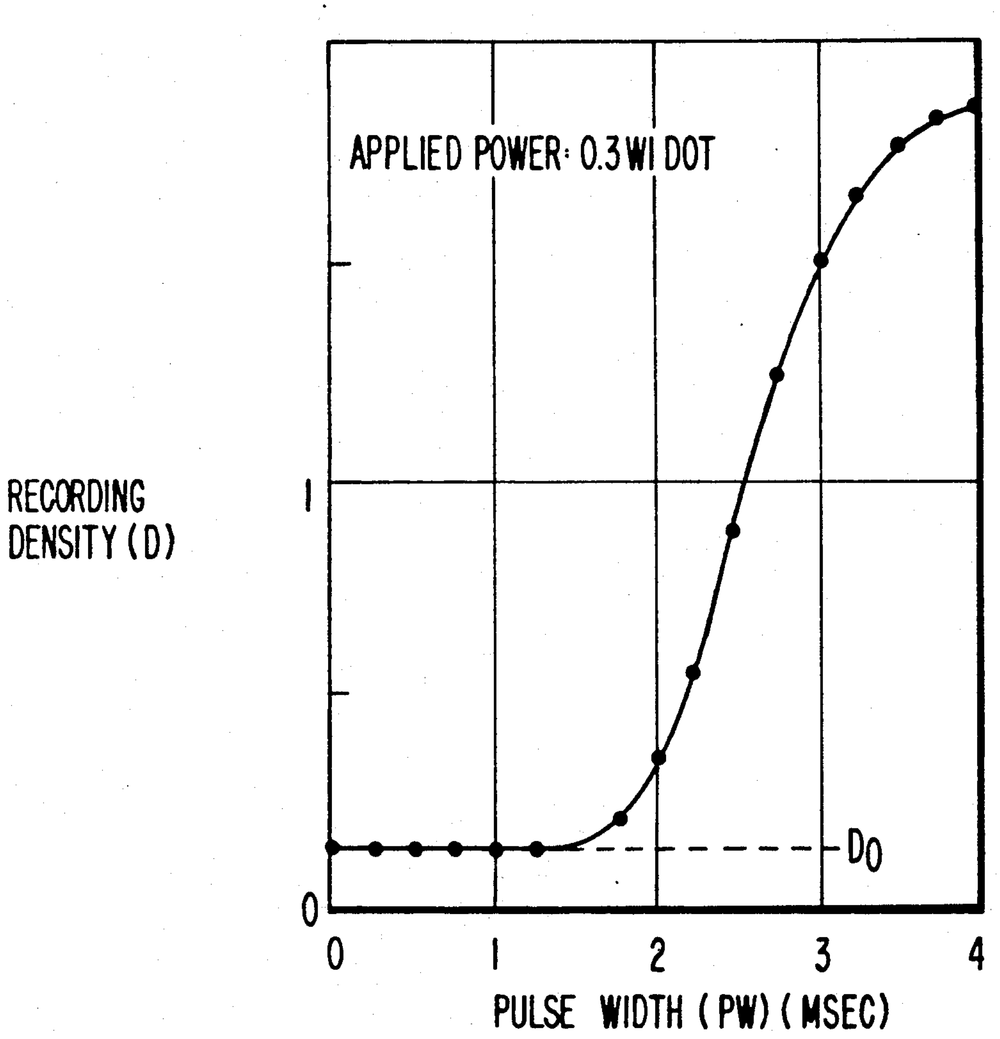
FIG. 3 shows the thermal transfer recording characteristics obtained in another embodiment of the thermal transfer recording apparatus of the invention.

FIG. 3 shows the recording characteristic obtained by using the coated surface of the resulting composite type recording medium 200 as the image-receiving surface and the above-described thermal transfer sheet 100 under the experimental recording conditions of Example 1 with the input power applied to each resistance heating element 401 being controlled at 0.3 W/dot.

The modified acrylic resin for the formation of the binder material 112 and normally solid particles 120 and the low molecular weight polystyrene for use as a coating material are compatible with each other in the controlled heating temperature range mentioned above and the cloud point of a 1:1 by weight mixture of these two resin materials was 127° C.

The compatibility of the binder material 112 with the normally solid particles 120 in the coating system assures a satisfactory affinity (ink receptivity) of the coating film with respect to the binder material 112 and particles 120. Due to such improvements in compatibility and ink receptivity, as the modulation pulse width $P_W$ of the recording signal 402 increases, the transfer of the ink material 110 to the coated surface begins with minute dot transfer due to the compatibility of the ink material 110 adherent to the top of particle 120 in contact with the coated surface and further due to mixfusion of the particles 120 with the coated surface.

Thus, as the experimental characteristic of FIG. 3 indicates, the recording density D rises smoothly from the surface density $D_o$ of the recording medium 200 so that the discontinuous rise-up of recording density D is prevented.

The principle of transfer after a further increase in the pulse width $P_W$ in this example is virtually not like the penetration 140 of the molten ink materials 112*a*, 112*b* across the surface of particles 120 but rather the particles 120 soften or melt according to the pulse width $P_W$ and, in association with the decrease of their hardness (viscosity), the particles are deformed under the platen pressure 300 so that they bleed out into the clearance 130*a* with respect to the recording medium surface 200*a* (the coated surface in this example). As a result, the area of contact with the molten ink layer 112*b* is expanded and the ink material 110 adherent to the crushed particles 120 is transferred to the recording medium surface 200*a*. Furthermore, because the precipitated particles 120 have a certain size (heights of projections) distribution, the large-sized particles 120 are destroyed under platen pressure 300 with an increasing pulse width $P_W$. In this manner, the coated surface is sequentially brought into contact with smaller particles 120 and these small particles carrying the ink material 110 are progressively transferred. This increase in the number of dot-transferred particles is the dominant characteristic of the principle of this example.

In this manner, with an increasing pulse width $P_W$, the ink material 110 is transferred along with the transfer of normally solid particles 120 and the recording density D increases as the result of the area-gradient punctuate transfer associated with the increase in ink transfer area centered around each particle 120 and the increase in the number of transferred dots.

As is apparent from the experimental characteristic shown in FIG. 3, the recording density D has a continuous tone gradient in response to the modulation pulse width $P_W$ of the recording signal 402, thus assuring reproduction of a satisfactory half-tone image record.

Furthermore, compared with the recording power input of 0.6 W/dot used in Example 1, the power used in this example was 0.3 w/dot or one-half of the input power of Example 1 and it is obvious that a drastic improvement in recording sensitivity can be obtained even in comparison with the characteristic C of FIG. 2.

The maximum (saturation) recording density D corresponds to the following condition. With an increasing pulse width $P_W$, the particles 120 progressively decrease in viscosity and are destroyed by platen pressure 300 until the projections formed by the particles have been almost completely eliminated so that the molten ink material 110 is totally transferred to the coated surface within the unit scanning spot. This is a saturation point of recording density D.

Another feature of this example as compared with Example 1 is that because the binder material 112 and normally solid particles 120 are made of the same material, the particles 120 transferred to the recording medium 200 has been fused to the binder material 112 to form an integral body (complete compatibility) so that the record surface is flat and smooth, thus giving a glossy print. A further advantage of this example is that because there is no foreign solid material such as alumina powder, the purity of the color of the resulting record is improved.

When this example is embodied using a thermal transfer sheet 100 in which 10.5 parts by weight of said 21 parts by weight of modified acrylic resin (softening point: 85° C.) is replaced with a low molecular polystyrene (Piccolastic ®, Exxon Chemical Co.) as the binder material 112, too, there is obtained a thermal transfer recording characteristic having an excellent continuous gradation in addition to the above-mentioned advantageous features.

The binder material 112 in this case is a binary material consists of a modified acrylic resin having a softening point of 85° C. and a low molecular weight polystyrene having a softening point of 75° C. and the normally solid particles 120 are precipitated particles of the modified acrylic resin having a softening point of 85° C. The modified acrylic resin with a softening point of 85° C. is compatible with the low molecular weight polystyrene with a softening point of 75° C. and the cloud point of a 1:1 by weight mixture of these resins is 78° C. Moreover, the low molecular weight polystyrene with a softening point of 75° C. and the low molecular weight polystyrene with a softening point of 95° C., which constitutes the coating layer of the recording medium 200 are also compatible with each other and the cloud point of a 1:1 by weight mixture thereof is lower than room temperature (25° C).

Then, using the same void-containing polyolefin film (TOYOPEARL ®, Toyobo Co., Ltd.) as described in Example 1 as the base sheet of the recording medium 200, its surface was first coated, by means of a bar coater, with a solution of a thermoplastic polystyrenepolyisoprene elastomer (Cariflex ®, Shell Chemical Corporation) in ethyl acetate (nonvolatile matter 10 wt. %) (dry coverage 2.5 g/m$^2$) and after drying, further coated with a solution of 40 parts by weight of a low molecular weight polystyrene having a softening point of 95° C. (Hymer ®, Sanyo Chemical Co., Ltd.) in 60 parts by weight of toluene-methyl ethyl ketone-isopropyl alcohol by means of a bar coater (dry coverage 1.2 g/m$_2$). Using this double-coated recording medium 200 and the heat transfer sheet 100 shown in FIG. 3, thermal transfer recording was performed on the low molecular weight polystyrene surface formed as above. As a result, despite the small thickness of the polystyrene surface layer of the recording medium 200, the same recording characteristic as FIG. 3 was obtained and, rather, the image quality was improved. The image quality was evaluated not only by visual inspection but also by investigation of the density distribution of respective scanning spots. For example, when the standard deviations at the mean density of 0.5 were compared, the standard deviation was 0.027 when the recording medium 200 having a surface layer composed of a low molecular weight polystyrene alone and it was 0.019 when the recording medium 200 having two surface layers, one composed of a lower molecular weight polystyrene and the other of a thermoplastic elastomer. Thus, the density distribution at a given recording energy (the same density recording) is narrower in the latter case, which means an improvement in image quality.

Furthermore, when the coating coverage of the recording medium having only a low molecular polystyrene film was set at 1.3 g/m$^2$, a local exfoliation of the film occurred during thermal transfer recording, indicating that the above-mentioned thermoplastic elastomer layer served as an adhesive layer.

The coating coverage for the thermoplastic elastomer layer in the above application is preferably in the range of 0.3 to 10 g/m$^2$. If its thickness is less than 0.3 g/m$^2$, no efficient improvement in flexibility is obtained. On the other hand, if the coating coverage of the thermoplastic elastomer layer exceeds 10 g/m$^2$, uneven coating occurs to give an irregular surface.

In the above examples, normally solid particles 120 were disposed on the side of the thermal transfer sheet 100 to produce surface irregularities as formed by the projection of at least one particle per unit scanning spot area on the thermal transfer sheet 100 so as to prevent solid contact of the thermal transfer layer 130 with the surface of the recording medium 200 upon pressing the thermal transfer layer 130 against the surface of the recording medium 200 and thereby prevent the occurrence of a binal density characteristic. Thus, this limited discrete contact assures a continuous gradation. This continuous gradation can also be obtained by providing the recording layer of the recording medium described above with irregularities as formed by the projection of at least one particle per unit scanning spot area.

Figure 4:
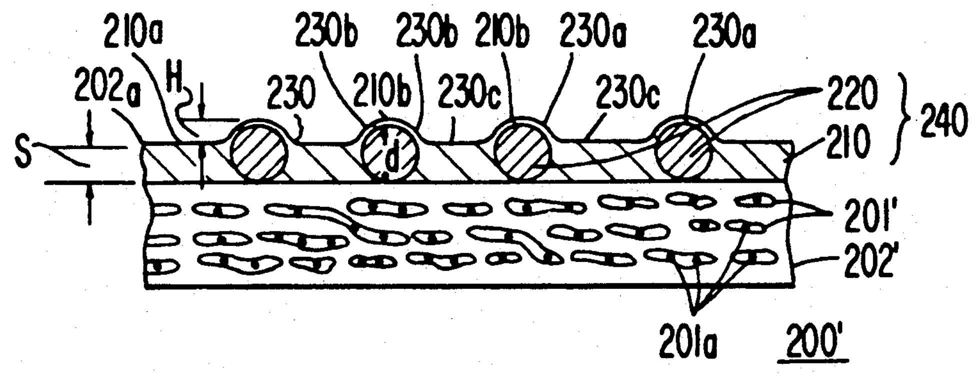
FIG. 4 is a cross section view of another embodiment of a recording medium sheet for use in the thermal transfer recording apparatus of the invention.

FIG. 4 is a cross-section view showing another recording medium sheet employed in a thermal transfer recording apparatus of the invention.

The recording medium 200' of this example is fabricated using, as the plastic base film 202', a void-containing biaxially oriented polyolefin film including inorganic particles **201*a*, such as particles of said calcium carbonate. The voids 201' are flat voids running in a laminar fashion with respect to the film surface and the voids are occasionally continuous. This base sheet is provided with a coating film 210 of a material which is partially or completely compatible with at least one component of the thermal transfer material, preferably with at least one component of the binder material Furthermore, normally solid particles (for example, particles of a solid substance) having a diameter d which is greater than the thickness s of layer 210 is incorporated in the coating layer 210 to form a compatible surface film 240 having an irregular surface. The ink material 110 is transferred onto the film 240**.

The particles having a diameter d are preferably colorless and clear or white from the standpoint of the brightness of reproduced color and the shape of the particles need not necessarily be spherical. Moreover, not only non-porous particles but also porous particles can be employed as said particles 220.

The particles 220, which are normally solid, may have a certain size distribution provided that there are particles having diameters greater than the thickness of the coating film (d>s).

Where the thermal transfer layer 130 is wholely made up of the ink material 110 alone, the above composite recording medium 200 does not cause a solid contact between the surface of the ink material layer and the surface 210a, of coating layer 210, of a material compatible with at least one component (for example, the binder material 112) of the ink material but causes a discrete punctate contact limited to the tops 230a of projections 230 constituted by particles 220.

Then, under controlled heating, the coating film 210b thinly covering the tops 230a of the projections becomes compatible with the binder material 112 so that the ink material 110 is transferred, as dots, to the tops 230a of the projections. As the modulation pulse width $P_W$ is broadened, the melt viscosity of the ink material 110 decreases. Since the coating film material 210 has been selected so as to be compatible with the ink material 110, for example the binder material 112, the wettability of the ink material 110 with respect to the coating film surfaces 230a, 230b and 230c (210a) has been improved. Therefore, by its wet tension and capillary phenomenon, the molten ink material 110 runs along the slope 230b of the projection toward the bottom of the projection (i.e. the recessed portion) according to its viscosity decrease and by the platen pressure 300 and the thermal expansion of voids (gas cells) 201', the projections 230 sink into the ink material 110 according to the viscosity decrease thereof, with the result that the ink material 110 is adhered and transferred to the slope 230b of the projection and even to the bottom 230c of the projection.

Therefore, the transfer amount of the ink material 110 can be continually controlled according to the change in its viscosity, that is to say in response to the modulation pulse width $P_w$ and further by utilizing the thermal expansion of voids 201', the recording sensitivity and the stability of recording characteristic can be improved. When the diameter of normally solid particles 220 (that is to say, the height of projections) has a distribution, the projections 230 sink into the ink layer 110 in the order of decreasing height in response to the increasing modulation pulse width $P_w$ so that the number of transferred dots of ink material 110 increases progressively so that a recording characteristic having an improved continuous tone gradient can be obtained.

When color recording is performed by the 3-color or 4-color method using a thermal transfer sheet 130 containing solid particles 120, if the projections 230 are not available in the recording medium 200 as in this example, the thermal transfer recording with the first primary color takes place on the flat surface 200a of the recording medium or the compatible coating film surface and the thermal transfer recording with the second primary color takes place on the irregular surface having irregularities formed by solid particles 120 transferred along with the ink material 110, so that a difference occurs in the surface condition of the recording layer surface between the first color record and the second color record, thus causing at times a poor ink trapping (a marked difference in the tranfer amount of ink of the second color at a given energy input between the area where the first primary color was transferred and the other area).

However, when there is a compatible film 240 having surface irregularities formed by projections 230, the first color is also transferred to the irregular surface so that the drawback of poor ink trapping can be obviated.

The recommended amount of normally solid particles, preferably solid particles, relative to the coating layer material 210 which is rendered compatible on heating with at least one component of the thermal transfer layer 130, particularly at least one component of the binder material, is in the range of 10 to 400 parts by weight based on 100 parts by weight of said material 210.

The particles 220 have a diameter distribution, with the maximum diameter being not more than 40 $\mu$m, preferably not more than 20 $\mu$m. The average diameter (median) of particles is preferably in the range of 2 to 10 $\mu$m. When this coating composition is coated by the solvent coating method and the solvent is evaporated, the punctate projections 230 are effectively formed at the sites of particles 220.

It is so arranged, as described above, that this irregular coating layer surface is compatible with at least one component of the thermal tranfer layer 130 material, particularly with at least one component of the binder material.

The above compatible irregular coating layer surface can be formed either by coating a plastic film containing a large number of fine voids, such as the one described hereinbefore, with a compatible coating composition or by bonding such a compatible film having surface irregularities onto said plastic film.

The above irregular coating surface can be easily produced by the solvent coating technique using said compatible coating composition.

One of the processes for forming the irregular coating layer surface is the conventional "orange peel" coating method in which a compatible coating composition containing a thermoplastic resin, wax or the like is coated on the plastic film by the solvent coating method and the solvent is evaporated. In another process, said normally solid particles 120 are incorporated in said compatible coating composition and the mixture is coated on the plastic base sheet by the solvent coating method to thereby form projections due to the presence of the normally solid particles.

The normally solid particles to be incorporated in the compatible coating material may be any of the same solid particles or particles which soften or melt in the controlled heating temperature range as those described hereinbefore. In this connection, the particles which soften or melt can be selected from among materials which are compatible with at least one component of the thermal transfer sheet 130 material, particularly at least one component of the binder material 112.

For color recording or full-color recording, the primary color pigments of cyan, magenta and yellow or the four color materials including black (for example, carbon black) are incorporated in the thermal transfer layers 130 of the thermal transfer sheet 100 and full-color thermal transfer recording is performed in the plane or line sequence. For such purposes, the normally solid particles to be incorporated in said compatible coating material is preferably particles of a solid. When particles which will soften or melt are used, the projections are deformed on softening or melting of the particles in the first recording so that the desired effect of the projections may not be achieved in the next thermal transfer recording.

The height (H) of projections on the film surface may have a distribution but the maximum height is preferably within the range of 1 to 5 μm and the centerline average roughness (JIS B 0601) is preferably in the range of 0.3 to 1.5 μm.

For assuring a satisfactory continuous gradation record, the coating coverage of the ink material layer 110 is preferably in the range of 0.5 to 2 g/m$^2$.

If the maximum height of projections beyond the film surface is less than 1 μm and the centerline average roughness is less than 0.3 μm, pressing of the ink material layer 110 against the film surface results in excessively intimate contact so that a continuous gradation record cannot be obtained. On the other hand, if the maximum height exceeds 5 μm and the centerline average roughness exceeds 1.5 μm, the ink material 110 is not transferred to the recess on the film surface even in the maximum recording density range so that the desired maximum recording density cannot be obtained and the quality of the reproduced image becomes coarse.

If the coating coverage of the thermal transfer layer 130, particularly the ink material layer 110, is less than 0.5 g/m$^2$, the shortage of coloring material 111 makes it impossible to obtain the required maximum transfer record density. On the other hand, if the coverage exceeds 2 g/m$^2$, the continuous gradation characteristic cannot be obtained.

EXAMPLE IV

The surface of a 9 μm-thick PET film 101 was coated with a composition containing 100 parts by weight of an ink material comprising 63.6 parts by weight of a phenol resin (Super Beckacite, Dainippon Ink and Chemicals, Inc.; m.p. 65° C.) as the binder material 112 and 36.4 parts by weight of a phthalocyanine blue pigment (CI Pigment Blue 15) as the coloring material 111 and 400 parts by weight of xylene by the solvent coating method to form a thermal transfer layer 130 comprising an ink material layer 110 at a coverage of 0.8 g/m$^2$ (on a dry basis), whereby a cyan-color thermal transfer sheet 100 was obtained.

A biaxially oriented polyolefin (polypropylene) film (TOYOPEARL ®, Toyobo Co., Ltd.) containing minute voids 201' nucleated by calcium carbonate particles **201*a* and having a thickness of 110 μm, which was similar to the one described in Example 1, was used as the base sheet 202' and the surface of this base sheet was coated with the following coating composition. Thus, 100 parts by weight of a rosin-modified maleic acid resin (Beckacite ®, Dainippon Ink and Chemicals, Inc.; m.p. 110° C.), as a coating material 210 compatible with the surface 202*a*, 143 parts by weight of alumina solid particles with an average particle diameter (50% weight value) of about 3 μm as the normally solid particles 220, and 143 parts by weight of xylene as the solvent, or a total of 143 parts by weight of materials, were mixed in a ball mill to prepare a coating suspension. This coating composition was evenly coated on the corona-treated surface 202*a* of the base sheet 202 by the solvent coating method using a bar coater and the solvent xylene was then evaporated to form surface projections 230 constituted by particles 220**.

The coating coverage of this compatible film 240 of the recording medium 200' was 4.5 g/m$^2$ (on a dry film basis). The maximum height of the projections was 1.7 μm and the centerline average roughness was 0.47 μm.

The above-mentioned phenol resin and rosin-modified maleic acid resin were compatible on heating and the cloud point of a 1:1 by weight mixture of the two materials was less than 25° C.

Using the above thermal transfer sheet 100 and composite recording medium 200', a thermal transfer recording test was performed in the same manner as Example 1. The experimental characteristic obtained is shown in FIG. 5.

Figure 5:
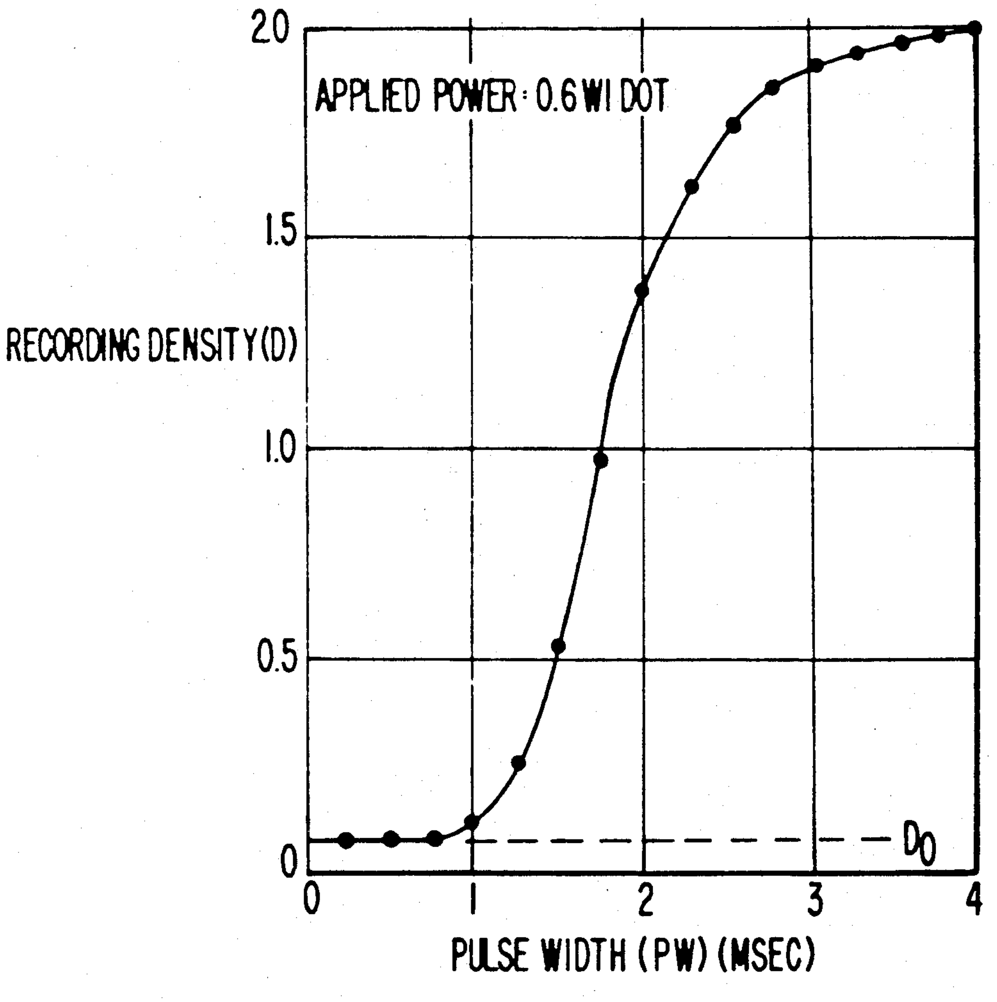
FIG. 5 shows the termal transfer recording characteristics obtained by a further transfer recording apparatus of the invention.

In this example, a large number of projections are located within the unit scanning spot area (4 dots/mm: 0.25. mm×0.25 mm) and as is apparent from FIG. 5, the recording density D rises up smoothly from the surface density Do of the recording medium 200', yielding a satisfactory continous gradation recording characteristic. Moreover, high-quality half-tone image reproduction was obtained.

In the above cyan color thermal transfer sheet 100, the phthalocyanine blue pigment as coloring material 111 was replaced with a quinacridone magenta pigment (CI Pigment Red 73915) or a chrome phthal yellow pigment (CI Pigment Yellow 93) to prepare a magenta color thermal transfer layer or a yellow color thermal transfer layer, and these layers and the above cyan-color thermal transfer layer 130 were formed in plane sequence in the longitudinal direction of the above-mentioned base film 101 to give a full-color thermal transfer sheet. Then, a color video still picture was scanned with a horizontal scanning dot number of 480 and a vertical scanning dot number of 640 (picture area; 12 cm×16 cm) and using the gamma-corrected color recording signal subjected to pulse width modulation at 6 bits, thermal transfer recording was carried out on the above-mentioned compatible film surface 240 in plane sequence in the order of yellow, magenta and cyan at a uniform main scanning speed of 16.7 msec/line. By the above procedure, a full-color thermal transfer record of fine-grained high image quality could be obtained.

When, as the color material 111, the cyan color pigment mentioned above was replaced with carbon black, black thermal transfer recording with continuous gradation could be performed. When carbon back was used in addition to the above-mentioned three primary color pigments and the four-color thermal transfer layers 130 were formed in plane sequence on the same base film 101 and four-color recording was performed in plane sequence, a satisfactory full-color record could be obtained.

In the cases of Examples 1 to 3, full-color recording could be performed by the 3-color method or the 4-color method. The color materials in the foregoing examples may be the ordinary printing inks or the pigments, dyes or mixtures thereof, which are commonly used.

Furthermore, while the compatibility of ink material 110 was described mainly with regard to the binder material 112 in the above examples, the present invention covers the cases in which the coloring materials 111 such as dyes and pigments, are compatible, upon heating, with at least one of the surface or coated surface 240 of the recording medium 200 and the normally solid particles 120, 220, and so on.

Furthermore, although continuous gradation thermal transfer recording was mainly described in the above examples, the present invention is also applicable to binary density thermal transfer recording which is carried out by forming the thermal transfer layer 110 as a mere flat ink material layer 130 and the surface film or compatible coating film of recording medium 200 as a flat surface.

It should also be understood that the descriptions and examples given hereinafter may be implemented in suitable combinations.

What is claimed is:

1. A thermal transfer recording apparatus comprising:

a recording medium sheet formed of a plastic film material, said recording medium sheet having an ink accepter surface and insulation/flexibility increasing means or insulating against heat conduction and for increasing flexibility of said ink accepter surface, said insulation/flexibility increasing means comprising numerous minute voids formed in said plastic film material;

a thermal transfer recording sheet formed of a heat resistive base sheet with opposing surfaces, and a thermal transfer layer coated onto one of said opposing surfaces of said base sheet, said thermal transfer layer comprising an ink material containing a binder material and being transferable to said ink accepter surface of said recording medium sheet, and particles which are solid at room temperature and are mixed into said thermal transfer layer in order to form minute protrusions on a surface of said thermal transfer layer;

means for raising the temperature of said thermal transfer layer in a controlled manner so as to decrease the viscosity of said thermal transfer layer; and means for transporting said recording medium sheet placed between said thermal transfer recording sheet and said temperature raising means.

2. A thermal transfer recording apparatus as recited in claim 1, wherein said minute voids in said recording medium sheet occupy between 30 and 100 cubic centimeters per 100 grams of said plastic film material.

3. A thermal transfer recording apparatus as recited in claim 1, wherein said plastic film material is polyolefin.

4. A thermal transfer recording apparatus as recited in claim 1, wherein said plastic film material comprises a biaxially stretched ethylene or propylene copolymer film containing inorganic particles.

5. A thermal transfer recording apparatus as recited in claim 1, wherein the apparent specific weight of said plastic film material is within a range of 0.58 to 0.70; and said plastic film material has a film thickness within a range of 50 to 250 microns.

6. A thermal transfer recording apparatus as recited in claim 1, wherein a coated layer is arranged on a surface of said plastic film material of said recording medium sheet, said coated layer being compatible with a constituent component of either said ink material, said particles which are solid at room temperature, or both said ink material and said particles which are solid at room temperature.

7. A thermal transfer recording apparatus as recited in claim 6, wherein said coated layer contains a component compatible with a constituent of said thermal transfer layer at raised temperatures; and said coated layer comprises a coated layer material and particles which are solid at room temperature and have a diameter greater than the thickness of said coated layer material, so as to provide a roughened surface to said coated layer.

8. A thermal transfer recording apparatus as recited in claim 6, wherein a constituent of said coated layer exhibits a rubber-like elasticity at room temperature.

9. A thermal transfer recording apparatus as recited in claim 6, wherein said particles of said coated layer comprise either thermo-softening resin material or wax which is compatible with a constituent of said coated layer material at raised temperatures.

10. A thermal transfer recording apparatus as recited in claim 1, wherein said numerous minute voids are enclosed by said plastic film material.

11. A thermal transfer recording apparatus comprising:

a recording medium sheet formed of a plastic film material, said recording medium sheet having an ink accepter surface and insulation/flexibility increasing means for insulating against heat conduction and for increasing flexibility of said ink accepter surface of said recording medium sheet, said insulation/flexibility increasing means comprising numerous minute voids formed in said plastic material, said recording medium sheet further having a coated layer coated onto a surface of said plastic material, said coated layer comprising a coated layer material, and particles which are solid at room temperature and have a diameter greater than the thickness of said coated layer material, so as to provide a roughened surface to said coated layer;

a thermal transfer recording sheet formed of a heat resistive base sheet with opposing surfaces, and as thermal transfer layer coated onto one of said opposing surfaces of said base sheet, said thermal transfer layer comprising an ink material containing a binder material and being transferable to said recording medium sheet;

means for raising the temperature of said thermal transfer layer in a controlled manner so as to decrease the viscosity of said thermal transfer layer;

means for transporting said recording medium sheet placed between said thermal transfer recording sheet and said temperature raising means; and wherein said coated layer of said recording medium sheet includes a component compatible with a constituent of said thermal transfer layer at raised temperatures.

12. A thermal transfer recording apparatus as recited in claim 11, wherein said numerous minute voids are enclosed by said plastic film material.

* * * * *